April 8, 1924.
H. D. CHURCH
MOTOR VEHICLE
Filed Jan. 25, 1919
1,489,383
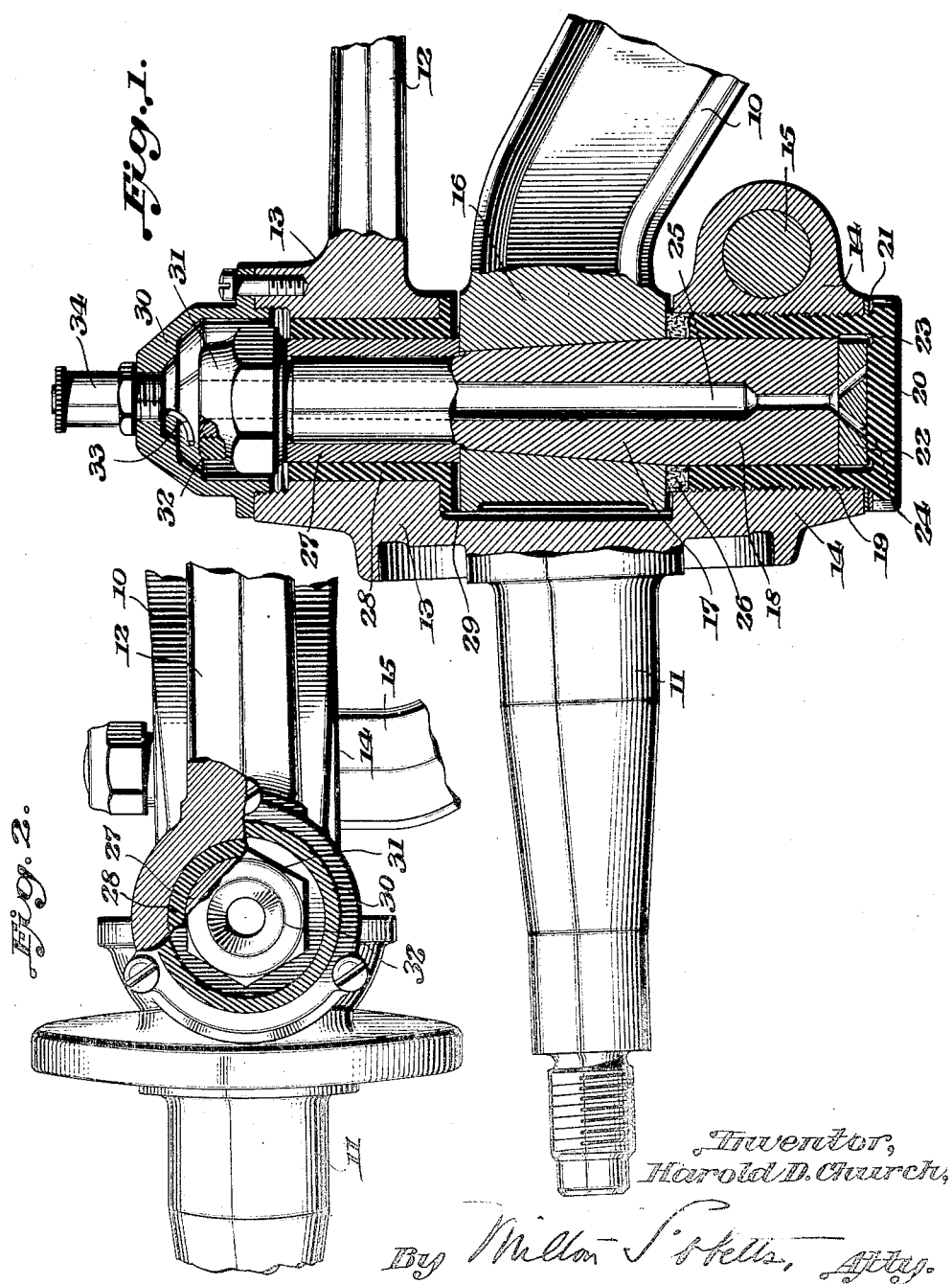

Patented Apr. 8, 1924.

1,489,383

UNITED STATES PATENT OFFICE.

HAROLD D. CHURCH, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed January 25, 1919. Serial No. 273,030.

*To all whom it may concern:*

Be it known that I, HAROLD D. CHURCH, a citizen of the United States, and resident of Detroit, Wayne County, State of Michigan, have invented certain new and useful Improvements in Motor Vehicles, of which the following is a specification.

This invention relates to motor vehicles, and particularly to improvements in the steering knuckles thereof.

One object of the invention is to provide a thrust plate for the pivot pin adapted to take up the downward thrust thereof and at the same time provide means to enable the passage of oil from the interior of the pin to the outside bearing surface thereof.

Another object of the invention is to provide an oil retaining member adapted to receive the pivot pin and thrust plate and adapted also to co-operate with other parts of the structure of the knuckle in effectually retaining the oil and excluding dirt from the bearing surface of said pin.

Another object of the invention is to provide means to provide a feed of a limited quantity of oil in drops to the pivot pin and its bearings.

With these and other objects in view, the invention is embodied in preferable form in the construction and arrangement hereinafter described and illustrated in the accompanying drawings in which:

Fig. 1 is a vertical sectional view, partly in side elevation, of a steering knuckle embodying the invention; and Fig. 2 is a horizontal cross section of the construction shown in Fig. 1.

Referring to the drawings, 10 is an axle, 11 a spindle of a motor vehicle, and 12 is a steering lever. The spindle has an integral upper annular knuckle member 13 which is in one piece with the steering lever 12, and which surrounds the pivot pin. Said spindle is also provided with a lower annular one-piece knuckle member 14 to which is adapted to be detachably connected an arm 15 of a steering connecting rod or tube. The axle terminates in an annular eye or socket which constitutes another knuckle member section 16 and which has a tapered seat to receive a tapered portion 17 of a pivot pin, the lower cylindrical portion 18 of which pin extends down into the lower knuckle member 14 of the spindle.

Adapted to be threaded into said lower knuckle member 14 and to surround the pin is an oil retaining cup 19 having a flange or head 20 extending over the base of the knuckle member section 14 and between which head and said base are placed shims 21. Between the said head of the cup and the lower end of the pivot pin is placed a floating thrust plate 22 which is spaced peripherally from the wall of the cup 19 by means of an annular groove 23 formed in said cup.

Oil passageways 24 are also formed through said thrust plate and communicate with a central passageway 25 extending through the pivot pin 17 longitudinally thereof from end to end of the same.

Between the upper end of the cylindrical retaining cup 19 and the hollow knuckle section 16 of the axle is mounted a felt packing 26, the principal object of which is to exclude dust and dirt from the bearing around the pivot pin but which also serves to retain the oil against escape from said space or bearing.

The upper section of the pivot pin is cylindrical in form and extends within the knuckle member section 13 of the spindle and is surrounded by bushing 27 and a sleeve 28 having a flange 29 extending under the lower surface of the knuckle section 13.

Engaging the bore of the knuckle section 13 at its upper end is a hollow cap 30 which provides an oil receiving chamber within which is seated the hollow head 31 of the pivot pin, which head is in the form of a nut of any suitable form. This nut has a ridge or wall 32 and directly above this ridge projects the lower end of a small wire or rod 33 which constitutes a dropper for the oil and which extends up into a small reservoir 34 mounted in the cap. As the oil is fed down along this dropper and falls therefrom upon the nut it will be divided by the wall, part of the oil going on the outside of the nut so as to pass against the outside surface of the pin and the remaining quantity going to the interior of the pin.

The parts of the knuckle are adapted to be separated by unscrewing the oil retaining cup member 19.

Having thus described my invention, what I claim and desire to secure by Letters Patent is:

1. A steering knuckle having a hollow pivot pin, a knuckle member, an oil retaining cup in said member within which said pin is mounted and a floating thrust plate between the end of said pin and the bottom of said cup, said thrust plate having means communicating with the hollow portion of said pivot pin for conducting oil to the under surface of said thrust plate.

2. A steering knuckle having a hollow pivot pin, a knuckle member, an oil retaining cup detachably carried by said member and within which said pin is mounted and a thrust plate disposed between the end of said pivot pin and the bottom of said cup, and having passages communicating with the pivot pin, said cup being provided with an annular recess surrounding the periphery of said thrust plate to permit the passage of oil.

3. A steering knuckle having a hollow pivot pin, a knuckle member, an oil retaining cup adjustably carried by said member within which said pin is mounted and a floating thrust plate between the end of said pin and the bottom of said cup and having a passage to conduct oil from the pivot pin to the bottom of the cup, said cup being provided with an annular recess surrounding the surface of said plate and extending beneath the outer edge thereof to permit the passage of oil.

In testimony whereof I affix my signature.

HAROLD D. CHURCH.